United States Patent
Sanderson et al.

(10) Patent No.: US 9,862,478 B2
(45) Date of Patent: Jan. 9, 2018

(54) MODULAR STRUCTURAL ASSEMBLY

(71) Applicant: AIRBUS OPERATIONS LIMITED, Bristol (GB)

(72) Inventors: Timothy Sanderson, Bristol (GB); Jonathan Price, Bristol (GB); Alexander Black, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 14/085,354

(22) Filed: Nov. 20, 2013

(65) Prior Publication Data
US 2014/0138485 A1 May 22, 2014

(30) Foreign Application Priority Data
Nov. 21, 2012 (GB) .................................. 1220937.5

(51) Int. Cl.
B64C 3/26 (2006.01)
B64C 3/18 (2006.01)
B64C 3/20 (2006.01)

(52) U.S. Cl.
CPC ................ B64C 3/26 (2013.01); B64C 3/182 (2013.01); B64C 3/20 (2013.01); *Y10T 29/49622* (2015.01)

(58) Field of Classification Search
CPC ...................................................... B64C 1/26
USPC ................ 244/123.7, 123.1, 123.12, 123.14
See application file for complete search history.

(56) References Cited

U.S. PATENT DOCUMENTS

| 6,116,539 | A | 9/2000 | Williams et al. | |
|---|---|---|---|---|
| 6,328,261 | B1 * | 12/2001 | Wollaston | B23K 20/122 228/112.1 |
| 6,364,250 | B1 | 4/2002 | Brinck et al. | |
| 6,386,481 | B1 * | 5/2002 | Kallinen | B64C 3/18 244/123.1 |
| 7,182,293 | B2 * | 2/2007 | Sarh | B64C 3/18 244/123.14 |
| 7,555,873 | B2 * | 7/2009 | Kilwin | F16B 5/08 244/131 |
| 7,641,147 | B2 * | 1/2010 | Schmidt | B64C 3/18 244/123.1 |
| 7,686,251 | B2 * | 3/2010 | Tanner | B64C 3/26 244/123.1 |
| 7,810,757 | B2 * | 10/2010 | Kirkwood | B64C 3/28 244/123.1 |

(Continued)

FOREIGN PATENT DOCUMENTS

| DE | 10 2004 058013 | 11/2006 |
|---|---|---|
| EP | 2 457 824 | 5/2012 |

(Continued)

OTHER PUBLICATIONS

Uk Search Report for GB Application No. 1220937.5, dated Mar. 21, 2013, Hal Young, 1 page.

(Continued)

*Primary Examiner* — Brian M O'Hara
*Assistant Examiner* — Keith L Dixon
(74) *Attorney, Agent, or Firm* — Nixon & Vanderhye P.C.

(57) ABSTRACT

A modular structural assembly to form part of an aircraft wing that has an outer skin and a plurality of stringers is disclosed. The assembly includes a plurality of panels, each panel having a portion that forms part of the outer skin and at least one stringer integrally formed with said portion.

21 Claims, 2 Drawing Sheets

(56) References Cited

U.S. PATENT DOCUMENTS

| | | | | |
|---|---|---|---|---|
| 7,841,835 B2* | 11/2010 | Bagepalli | ............... | F03D 1/0675 |
| | | | | 416/226 |
| 7,909,952 B2* | 3/2011 | Kato | .................... | B64F 5/0009 |
| | | | | 156/285 |
| 8,172,179 B2* | 5/2012 | Crawford | ................ | B64C 3/187 |
| | | | | 244/123.7 |
| 8,695,219 B2* | 4/2014 | Munk | ................... | B64F 5/0009 |
| | | | | 244/123.1 |
| 2001/0015043 A1 | 8/2001 | Brennels et al. | | |
| 2004/0055349 A1 | 3/2004 | El-Souclani | | |
| 2008/0042011 A1 | 2/2008 | Childs | | |
| 2009/0200423 A1* | 8/2009 | Tucker | ...................... | B64C 3/18 |
| | | | | 244/123.1 |
| 2010/0037998 A1 | 2/2010 | Bray et al. | | |
| 2012/0187246 A1* | 7/2012 | Motohashi | ............. | B64D 37/06 |
| | | | | 244/123.1 |

FOREIGN PATENT DOCUMENTS

| | | |
|---|---|---|
| EP | 2 473 109 | 7/2012 |
| EP | 2 479 109 | 7/2012 |
| GB | 2 344 807 | 6/2000 |

OTHER PUBLICATIONS

European Search Report cited in EP 13193203.0, dated Jul. 14, 2017, nine pages.

* cited by examiner

MODULAR STRUCTURAL ASSEMBLY

This application claims priority to UK Application No. 1220937.5 filed 21 Nov. 2012, the entire content of which is hereby incorporated by reference.

INTRODUCTION

The present invention relates to a modular structural assembly. More particularly, it relates to a modular structural assembly that forms part of an aircraft wing that includes an outer skin and a plurality of stringers. A box section for an aircraft wing, an aircraft wing including a structural assembly according to the invention, together with a method of forming an aircraft wing, is also disclosed.

BACKGROUND

In conventional commercial aircraft wing design, it is common to use a structural box to carry the majority of the load developed by lift and other high load devices. An example of part of such a box 1 is illustrated in the perspective view of FIG. 1 from which it can be seen that it is built from a number of different sections including spars 2, ribs 3 and stringers 4, which form the main load-bearing structural components of the wing. The box 2 is covered with an outer skin 5. The spars 2 are the principle lateral members of the load-bearing structure and these are connected together with the ribs 3 that provide support and strength to the structure. The stringers 4 are attached to the outer skin 5 to provide longitudinal reinforcement.

Each of the above-mentioned sections are bolted together to form the wing box section. However, this requires significant expense in drilling holes, deburring, sealing and fitting of the nuts and bolts. The nuts and bolts also add significant weight to the structure.

Although the use of at least some bolts can be avoided by forming the box structure from a composite material with the stringers co-cured into the box, or by forming them with a sandwich structure or with wound composite cells, such structures are prone to damage and moisture ingress.

The present invention seeks to overcome or substantially alleviate at least some of the problems with conventional assemblies referred to above.

SUMMARY OF THE INVENTION

According to the invention, there is provided a modular structural assembly to form part of an aircraft wing that has an outer skin and a plurality of stringers, the assembly including a plurality of panels, each panel having a portion that forms part of the outer skin and at least one stringer integrally formed with said portion.

In a preferred embodiment, each panel comprises two or more stringers each having an upper end remote from said portion, and a cover plate attachable to said stringers to connect said upper ends together to form a cell enclosed by said portion, the stringers and the cover plate. The formation of a cell using the cover plates increases wing stiffness and load carrying capacity.

The cover plates are attachable to said stringers by welding, preferably by friction stir welding which is a relatively simple process that is much easier to achieve than by bolting.

In some embodiments, a crack retarding element is positionable in the cell.

The outer skin portion of each panel has an edge and adjacent panels can be attachable to each other along said edge.

Preferably, the assembly comprises a spar cap element and a spar and the spar is attachable to a panel via said spar cap element.

The spar cap element may comprise a portion that forms part of the outer skin. An edge of said portion may then be attachable to an edge of an outer skin portion of a panel, preferably by welding, such as friction stir welding.

The spar cap element preferably has a spar attachment member upstanding from said outer skin portion and a spar. The spar may then be attachable to said spar attachment member. Preferably, the spar is attachable to the spar attachment member by welding, such as friction stir welding.

In some embodiments, the assembly comprises upper and lower set of panels, the panels of each set being attachable to each other along adjacent edges, the edge of a spar cap being attachable to the edge of a panel at either end of each of the upper and the lower sets of panels, and a spar attachable to spar attachment members so as to extend between said upper and lower sets of panels at each end to form an enclosed wing box section.

Preferably, the panels are attachable to each other by welding, most preferably by friction stir welding.

The panels may be formed by extrusion. The spar caps, cover plates and spars may also be formed by extrusion.

According to another aspect of the invention, there is provided a box section for an aircraft wing comprising a modular structural assembly including upper and lower sets of panels, each panel being integrally formed and comprising a part that forms an outer skin portion of an aircraft wing and a stringer, the panels of each set being attached to each other along adjacent edges, and a spar cap attached to a panel at either end of each of the upper and lower sets of panels, a spar attached to said spar caps at each end and extending between said upper and lower sets of panels.

According to another aspect of the invention, there is also provided an aircraft wing comprising a modular structural assembly or a box section according to the invention.

According to the invention, there is also provided a method of forming part of an aircraft wing that has an outer skin and a plurality of stringers, including attaching a plurality of panels together, each panel having a portion that forms part of the outer skin and at least one stringer integrally formed with said portion.

DESCRIPTION OF THE EMBODIMENTS

Figure 3:
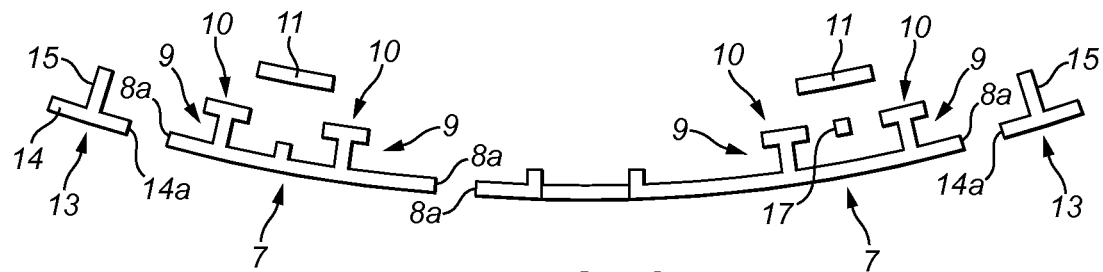
FIG. 3 shows part of the wing box structure shown in FIG. 2 in an exploded state.
Figure 4:
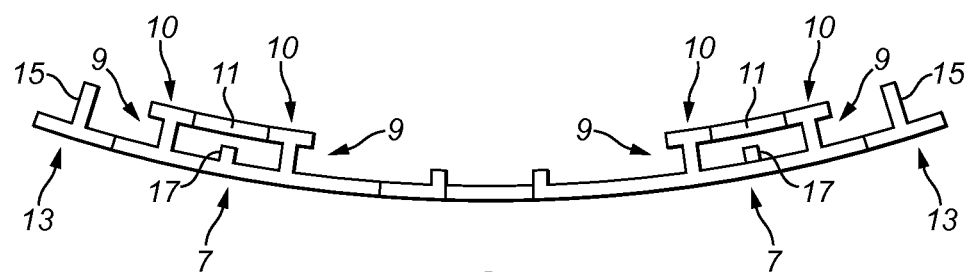
FIG. 4 shows the part of the wing box structure of FIG. 3 the cover plates and spar caps attached to a plurality of panels.

Embodiments of the invention will now be described, by way of example only, with reference to FIGS. 2 to 4 of the accompanying drawings.

Figure 1:
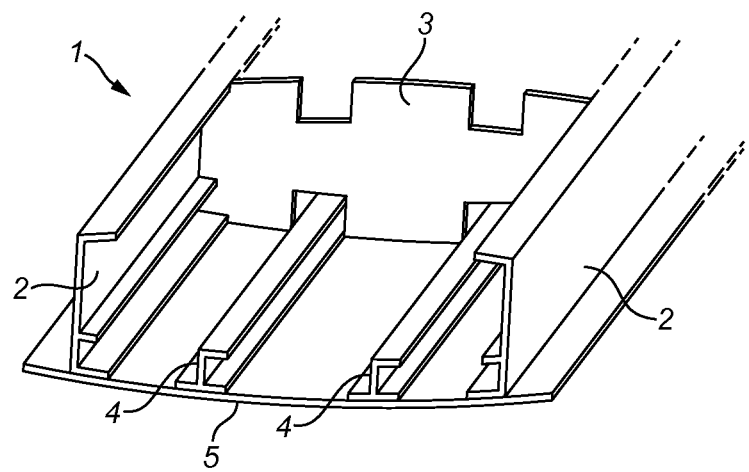
FIG. 1 shows a perspective view of part of a prior art wing box structure for an aircraft.
Figure 2:
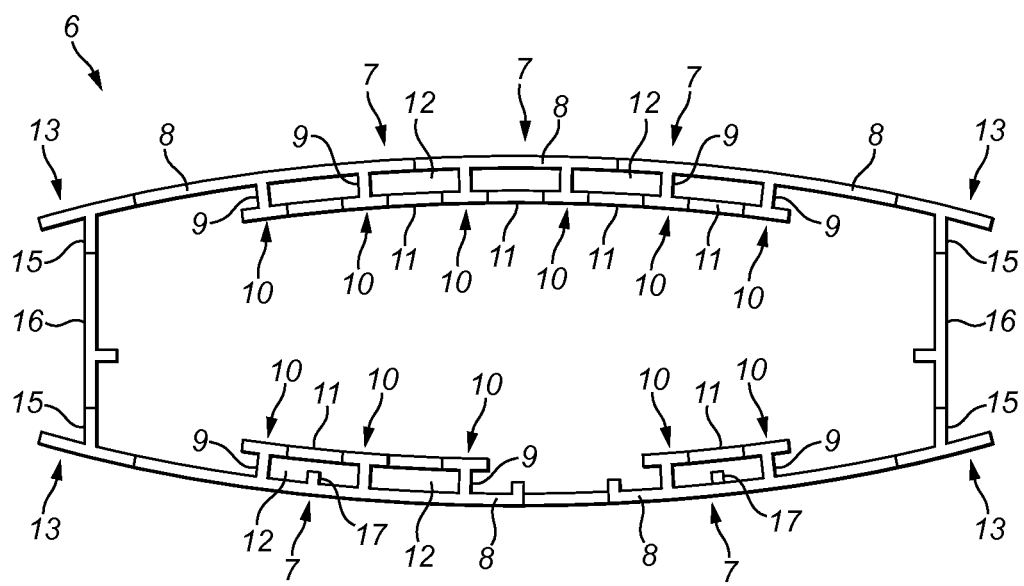
FIG. 2 shows a side elevation through a wing box structure for an aircraft according to an embodiment of the present invention.

The wing box structure 6, shown in FIG. 2, is formed from an assembly of modular structural elements or components.

The elements include a plurality of panels 7, each panel having a portion that faces outwardly and forms part of the outer skin 8 and at least one stringer 9 integrally formed with the portion 8. Most of the panels 7 shown in FIG. 2 have two stringers 9, although one panel 7 is shown as having three. The outer skin portion 8 of each panel 7 has an edge 8a and adjacent panels 7 are attached to each other along said edges.

The stringers 9 of each panel upstand from the portion 8 that forms the outer skin and each have an upper end to remote from said portion 8. As shown in FIGS. 2, 3 and 4, the stringers 9 may have a substantially 'T' shaped cross-sectional profile, although other profiles are also envisaged.

To increase wing stiffness and load carrying capacity, a cover plate 11 is attached to an extends between the upper ends to of adjacent stringers 9 so as to form an enclosed cell 12 bounded by the outer skin portion 8, the stringers 9 and the cover plate 11. Locally reinforced holes (not shown) may be provided in the cover plates 11 to facilitate inspection with a bore scope. The cells 12 can also serve as integrated fuel and/or vent pipes. As the cover plates 11 improve the load carrying ability of the structure, it may be possible to reduce the thickness of the material used for the components or to increase the distance between adjacent ribs.

A crack retarding element 17 may be located in one or more cells. The element 17 may either be independent to the panel 7 or, it may be integrally formed with the outer skin portion.

The wing box structure 6 also includes spar end caps 13. Each spar end cap 13 has a portion 14 that forms part of the outer skin and includes an edge 14a attachable to an edge 8a of a portion of a panel 7. End cap 13 also includes a spar attachment member 15 integrally formed with said portion 14 and which upstands from said portion 14. A spar attachment member 15 may be disposed between any number of panels 7 or at the end of a run of panels 7.

As shown in FIG. 2, a spar 16 extends between spar attachment members 15 at opposite ends of upper and lower sets of attached panels 7 to space said sets of attached panels from each other and support them in position.

The components of the assembly are preferably all formed from an extruded metallic material and all the components can be joined using butt joints rather than by overlapping joints, preferably by welding and most preferably by friction stir welding, which is an inexpensive and quick manufacturing process. This allows for a low cost, low weight wing to be developed with little or no bolted joints. Once welding is complete, the assembly can be machined in one operation to remove surface material to improve the fatigue performance and to obtain the optimum thickness for aircraft loading.

Although the invention has primarily been described as applying to the main structural component of the wing, it will be appreciated that the same concept can be applied to the fabrication of any other aerofoil section, including flaps, slats and tail planes.

It will be appreciated that the foregoing description is given by way of example only and that modifications may be made to the support assembly of the present invention without departing from the scope of the appended claims.

The invention claimed is:

1. A modular structural assembly to form part of an aircraft wing, the modular structural assembly having a plurality of upper panels, each comprising an upper outer skin portion comprising an edge, the edges of adjacent upper outer skin portions being attachable to each other, and a plurality of lower panels each comprising a lower outer skin portion comprising an edge, the edges of adjacent lower outer skin portions being attachable to each other, wherein at least two adjacent upper panels each comprise at least one stringer integrally formed with said upper outer skin portion as a single piece component, and at least two adjacent lower panels comprise at least one stringer integrally formed with said lower outer skin portion as a single piece component;

wherein each of the at least one stringer of each of the upper panels and each of the lower panels comprises a remote end and extends from the upper or lower outer skin portions to the remote end; and a cover plate is attached to the remote ends of at least two of the stringers on adjacent ones of the upper or lower panels, such that an enclosed cell is formed by the cover plate, the at least two of the stringers, and the upper or lower outer skin portions of the two adjacent upper or lower panels.

2. A modular structural assembly according to claim 1, wherein each panel comprises two stringers each having an upper end remote from said portion, and a cover plate attachable to said stringers to connect said upper ends together to form a cell enclosed by said portion, the stringers and the cover plate.

3. A modular structural assembly according to claim 2, wherein the cover plates are attachable to said stringers by welding.

4. A modular structural assembly according to claim 2, comprising a crack retarding element positionable in the cell.

5. A modular structural assembly according to claim 1, comprising a spar cap element and a spar, the spar being attachable to a panel via said spar cap element.

6. A modular structural assembly according to claim 5, wherein said spar cap element comprises a portion that forms part of the outer skin, said portion having an edge attachable to an edge of an outer skin portion of a panel.

7. A modular structural assembly according to claim 6, wherein said portion of the spar cap that forms part of the outer skin is attachable to an edge of an outer skin portion of a panel.

8. A modular structural assembly according to claim 7, wherein said portion of the spar cap that forms part of the outer skin is attachable to an edge of an outer skin portion of a panel by welding.

9. A modular structural assembly according to claim 7, wherein said spar cap element has a spar attachment member upstanding from said outer skin portion, said spar being attachable to said spar attachment member.

10. A modular structural assembly according to claim 9, wherein said spar is attachable to a spar attachment member by welding.

11. A modular structural assembly according to claim 9, comprising, a spar cap being attachable to a panel at either end of each of the upper and the lower sets of panels, and a spar attachable to said spar caps so as to extend between said upper and lower sets of panels at each end to form an enclosed wing box section.

12. A modular structural assembly according to claim 9, wherein the panels are attachable to each other by welding.

13. A modular structural assembly according to claim 9, wherein at least the panels are formed by extrusion.

14. A box section for an aircraft wing comprising
a modular structural assembly that has upper and lower outer skins and a plurality of stringers,
a plurality of upper panels, each comprising an upper outer skin portion comprising an edge, the edges of adjacent upper outer skin portions being attachable to each other to form said upper outer skin, and a plurality of lower panels, each comprising an lower outer skin portion comprising an edge, the edges of adjacent lower outer skin portions being attachable to each other to form said lower outer skin, each upper panel having at least one integrally formed stringer and each lower panel having at least one integrally formed stringer, wherein a stringer and a panel together form a single piece component, an upper spar cap element at either end of the plurality of upper panels, wherein each of the upper spar cap elements comprises a portion that forms part of the upper outer skin, said portion having an edge attachable to an edge of an outer skin portion of a panel, a lower spar cap element at either end of the plurality of lower panels, wherein each of the lower spar cap elements comprises a portion that forms part of the lower outer skin, said portion having an edge attachable to an edge of an outer skin portion of one of the lower panels, and a spar attached between said upper and lower spar cap elements at each end and extending between said upper and lower pluralities of panels.

15. An aircraft wing comprising a modular structural assembly according to claim 1.

16. The modular structural assembly of claim 1 wherein the single piece component is a single piece metal extruded component.

17. The box section of claim 14 wherein the panel is a single piece extruded metal panel.

18. The modular structural assembly of claim 1, wherein the modular structural assembly is a single piece metal extruded component.

19. A modular structural assembly according to claim 1, wherein the attached edges of the plurality of upper panels extend between leading and trailing edges of the plurality of upper panels in a span wise direction, and the attached edges of the plurality of lower panels extend between leading and trailing edges of the plurality of lower panels in a span wise direction.

20. The box section according to claim 14, wherein said spar cap element has a spar attachment member upstanding from said outer skin portion, said spar being attachable to said spar attachment member.

21. A modular structural assembly to form part of an aircraft wing, the modular structural assembly having a plurality of upper panels, each comprising an upper outer skin portion comprising an edge, the edges of adjacent upper outer skin portions being attachable to each other, and a plurality of lower panels each comprising a lower outer skin portion comprising an edge, the edges of adjacent lower outer skin portions being attachable to each other, wherein each upper panel comprises at least one stringer integrally formed with said upper outer skin portion as a single piece component, and at each lower panel comprises at least one stringer integrally formed with said lower outer skin portion as a single piece component;

wherein each panel comprises two stringers each having an upper end remote from said portion, and a cover plate attachable to said stringers to connect said upper ends together to form a cell enclosed by said portion, the stringers and the cover plate, said cover plate having an edge attachable to an edge of each of said upper ends of said stringers.

\* \* \* \* \*